United States Patent [19]
Flood et al.

[11] Patent Number: 5,935,493
[45] Date of Patent: Aug. 10, 1999

[54] METHOD FOR BLOW-MOULDING

[75] Inventors: Nicholas Gerard Flood; Patrick Beirne, both of County Westmeath, Ireland

[73] Assignee: Menza Limited, County Westmeath, Ireland

[21] Appl. No.: 08/767,482

[22] Filed: Dec. 16, 1996

[30] Foreign Application Priority Data

Oct. 25, 1996 [IE] Ireland ..................................... 960749

[51] Int. Cl.⁶ .................................................. B29C 49/04
[52] U.S. Cl. ........................ 264/39; 264/209.8; 264/540; 425/532
[58] Field of Search ..................................... 264/515, 540, 264/209.8, 39; 425/532, 376.1, 380, 382.4

[56] References Cited

U.S. PATENT DOCUMENTS

| | | | |
|---|---|---|---|
| 3,329,752 | 7/1967 | Heider et al. ............................. | 425/532 |
| 3,452,125 | 6/1969 | Schurman et al. ....................... | 264/540 |
| 3,574,808 | 4/1971 | Matthews et al. ....................... | 264/209.8 |
| 4,402,898 | 9/1983 | Rosenbaum .............................. | 264/173 |
| 4,422,838 | 12/1983 | Iwawaki et al. ......................... | 264/540 |
| 4,519,976 | 5/1985 | Uhlig ....................................... | 264/540 |
| 5,273,421 | 12/1993 | Kanoh et al. ............................ | 425/532 |

FOREIGN PATENT DOCUMENTS

| | | | |
|---|---|---|---|
| 61-10432 | 1/1986 | Japan ...................................... | 264/540 |
| 62-223731 | 10/1987 | Japan ................................... | 264/209.8 |
| 64-87226 | 3/1989 | Japan ...................................... | 264/540 |
| 1118371 | 7/1968 | United Kingdom . | |
| 1234182 | 6/1971 | United Kingdom . | |
| 1399654 | 7/1975 | United Kingdom . | |

*Primary Examiner*—Catherine Timm
*Attorney, Agent, or Firm*—Jacobson, Price, Holman & Stern, PLLC

[57] ABSTRACT

In a method of blow moulding, a parison is extruded by pushing a hollow tube of hot thermoplastic material through a die gap 2 between a mandrel 3 and die 1. An exit compression ring 5 is formed on the mandrel 3 adjacent to the die exit 2. The ring acts as a flow enhancer to ensure free flow of the thermoplastic material. Outer surfaces of the die 1 and mandrel 3 may be provided with release strips 9, 10 to prevent the parison becoming stuck to the die face.

11 Claims, 2 Drawing Sheets

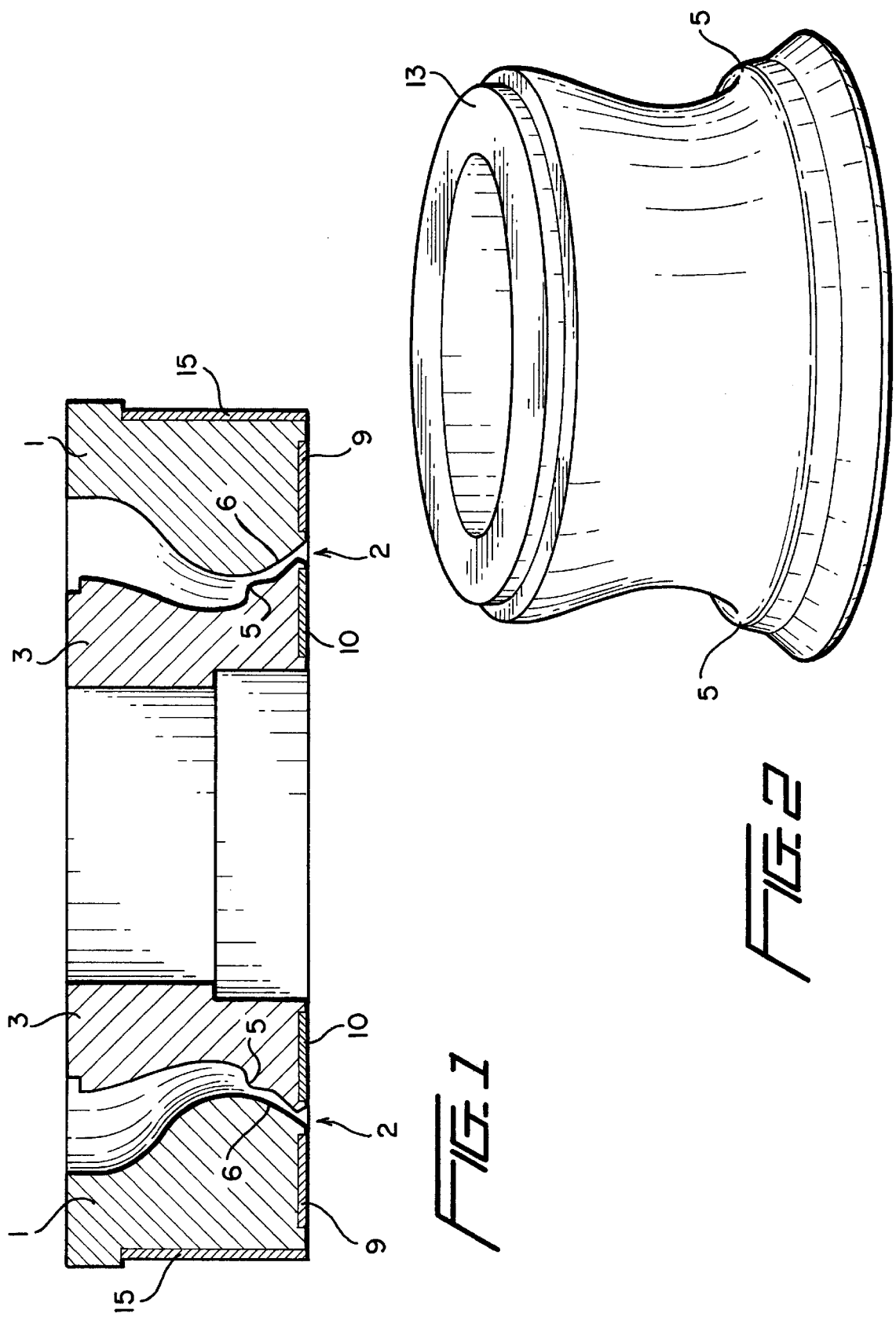

METHOD FOR BLOW-MOULDING

INTRODUCTION

The invention relates to extrusion blow moulding. More particularly, the invention relates to a method of blow-moulding thermoplastics material to form a blow moulded article such as a case, for example, a tool case comprising two case halves connected by a hinge.

More particularly, the invention relates to a method of blow moulding thermoplastics material of the type comprising the steps of:

extruding a parison by pushing a hollow tube of hot thermoplastics material through a die gap between a mandrel and a die;

closing a pair of mould halves around the extruded parison;

inserting a blow pin into the parison;

blowing air through the blow pin to inflate the parison against the mould halves; and releasing a formed article from the mould;

The first step in extrusion blow moulding is to form a hollow parison of molten thermoplastics material which is then formed into a desired shaped article.

A typical accumulator head of the type conventionally used in formation of a parison for blow moulding is illustrated in FIG. 1A. A continuous flow of molten thermoplastics material enters the accumulator head through an extruder A at an inlet side. The thermoplastics material is formed into a hollow tube which is extruded through a predetermined gap B defined between a mandrel C and die D at a lower outlet.

Thermoplastics material flows from the extruder A fitted with a flange adapter F. through an adaptor G. a diverter H and down over a torpedo I. The function of the torpedo I is to convert a rod of the thermoplastics material into a hollow tube. The torpedo I is supported by a spider J. After flowing over the spider J, the thermoplastic material enters a melt accumulator chamber K. This causes a push out piston L to be pushed upwardly under the pressure of the thermoplastics material. When a desired preset volume of thermoplastics material has accumulated a push out cylinder M is pressurised, the die gap B is opened and the material is extruded in the form of a hollow tube through the preset die gap B.

In this case, it will be noted that the push out cylinder $M^1$ is illustrated to the left hand side of FIG. 1A in the raised position in which the thermoplastics material accumulates in the melt accumulator chamber K. The push out cylinder $M^2$ to the right hand side of FIG. 1A is illustrated in the extended position in which the thermoplastics material may be extruded through the die gap B.

In the case of FIG. 1A, the mandrel and die are of the converge tooling type used for extruding a parison of relatively small diameter. To form a parison of larger diameters the tooling is changed and diverge tooling is used.

There are a number of problems with parisons formed using such conventional accumulator heads.

The surface finish of the parison controls the exterior finish of the outside surface of the moulded article. Normally after a short time in production, thermoplastics material starts to build up on the inner surfaces of the head and extrusion tooling which gives rise to imperfections including die lines, contamination, burned material, flow lines, and uneven surface finish.

The quality of the finished article is therefore adversely affected. In order to overcome this problem frequent die and mandrel cleaning operations with considerable downtime are required.

In addition, due to material build up around the faces of the die and mandrel, the extruded parison often fails to drop cleanly into an open mould. This causes further problems in reject parts, stoppages to clean the surfaces, contamination, and inconsistent material distribution.

The invention is characterised in that the parison is formed by passing the hollow tube of hot thermoplastics material through an exit compression means adjacent to the die exit to clean the surface of the die as the hollow tube of thermoplastics material passes therethrough.

Preferably the exit compression means comprises a flow restrictor adjacent to the die exit. Typically the flow restrictor is an exit compression ring adjacent to the die exit.

In a preferred embodiment of the invention the exit compression means forms an extension of the mandrel and projects from the mandrel towards the die. In this case preferably the exit compression means projects from the mandrel for a distance of at least 0.2 mm towards the die, most preferably for a distance of approximately 0.3 mm towards the die.

In another embodiment of the invention the method includes the step of enhancing the flow of thermoplastic material along the die by treating the die surface to enhance wear resistance and to enhance flow of thermoplastics material. Preferably the die face is ion impregnated.

In a further embodiment of the invention the method includes the step of automatically releasing a formed parison from the outer faces of the die and mandrel. Preferably release means is provided on the outer faces of the die and mandrel. Ideally the release means is a first strip of teflon material provided along the outer face of the die and a second strip of teflon material provided along the outer face of the mandrel.

In another embodiment of the invention the method includes the step of heating the die at least adjacent to the die gap. In this case typically the die is heated by applying a heater band to the outside of the die.

The invention also provides an extrusion blow moulded article whenever formed by the method of the invention.

The invention will be more clearly understood from the following description thereof given by way of example only with reference to the accompanying drawings in which:

FIG. 1 is a schematic cross sectional view of a mandrel and die section of an accumulator head according to the invention and used in the method of the invention; and FIG. 2 is a perspective view of the mandrel part of the accumulator head of FIG. 1.

Figure 1A:
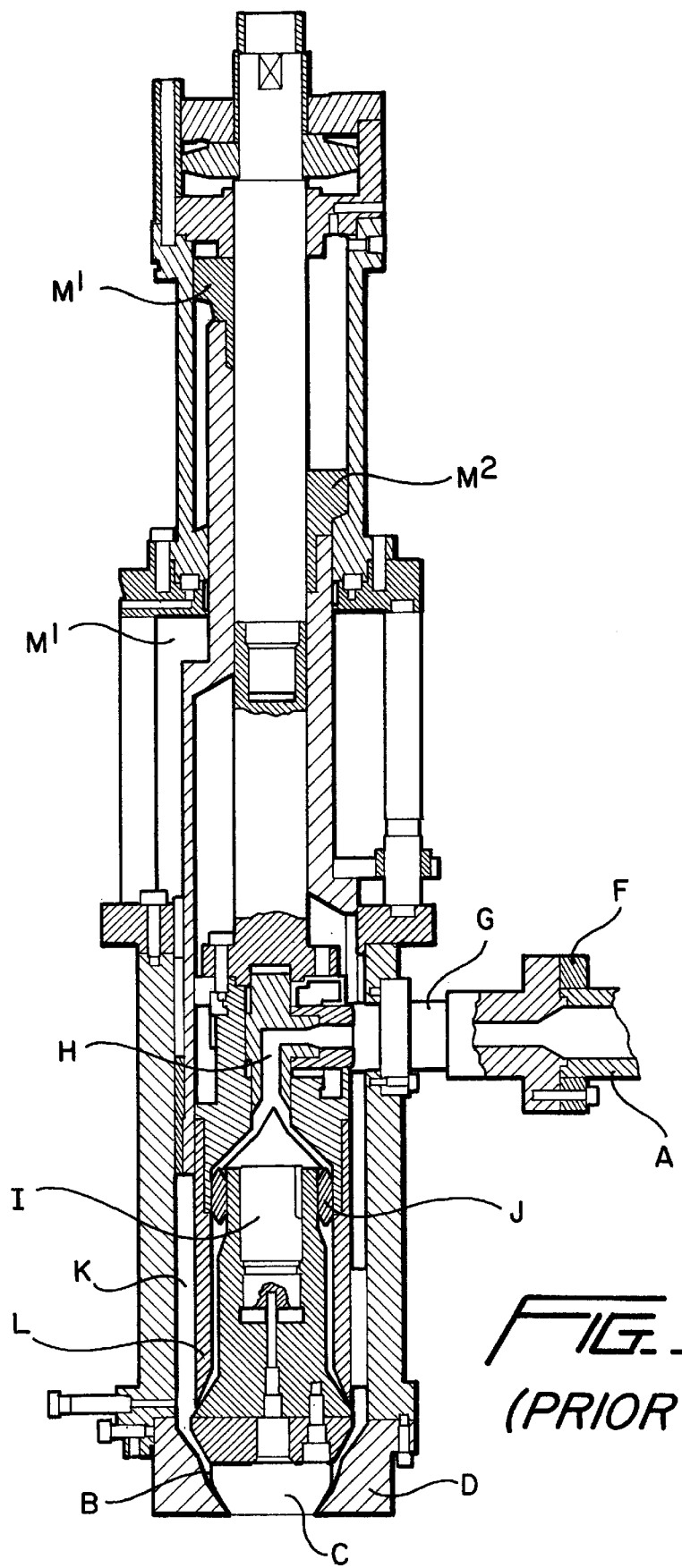
FIG. 1A is a schematic view of a typical accumulator head of the type conventionally used in formation of a parison for blow moulding.

Referring to FIGS. 1 and 2, there is illustrated portion of a die 1 and mandrel 3 with a gap 2 therebetween. The die 1 and mandrel 3 are provided with a number of features to self clean the die 1 as a tubular parison is formed in the method of blow moulding according to the invention.

An exit compression means is provided by an exit compression ring 5 in this case formed on the mandrel 3 adjacent to the die exit 2. The ring 5 acts as a flow enhancer which ensures free flow of the thermo-plastic material across the surface of the die 1 adjacent to the die exit 2. The exit compression ring 5 presents an obstruction to the flow of hot thermoplastics material and creates turbulent-type flow of the material. This ensures that the thermoplastic material is maintained at a flowrate such that the material does not become stuck to the face of the mandrel and/or die adjacent to the die exit.

Typically, in the case of high density polypropylene the diameter of the flow restrictor compression ring 5 is approximately 0.3 mm.

The surface 6 of the die is treated to enhance wear resistance and to enhance flow of thermoplastic material. In this case, the die face is ion impregnated.

Outer surfaces of the die 1 and mandrel 3 are provided with a release means. In this case, the release means is provided by Teflon inserts 9,10 for the die and mandrel respectively. (Teflon is a Trade Mark)

A heater band 15 may be provided on the die 1 to enhance flow characteristics.

The self cleaning action is an important feature of the invention as it results in improved surface finish, elimination of imperfections caused by die lines, a reduction in the frequency of shut-downs for cleaning and a lowering in parison stress which greatly reduces the amount of faults and welding problems associated with moulding products when the two sides are close together.

The provision of release means on the outer surfaces of the die and mandrel eliminates problems associated with the parison sticking to the die face and avoids problems associated with degraded material stuck to the die face breaking away and contaminating the parison.

The invention is not limited to the embodiments hereinbefore described which may be varied in detail and construction. For example, it will be appreciated that the invention may be applied to converge or diverge tooling.

We claim:

1. A method of blow moulding thermoplastics material comprising the steps of:

forming hot thermoplastics material into a hollow tube;

extruding a parison by pushing the hollow tube of thermoplastics materials through a die head;

the die head comprising a mandrel and a die spaced-apart to define a gap therebetween, the die head having a lower die exit leading from the gap, the die head having an exit compression ring extending from the mandrel or die into the gap adjacent to the lower die exit and the die and the mandrel including continuously curved surfaces in a region of the gap and adjacent to the exit compression ring, passing the tube of hot thermoplastics material over the compression ring adjacent to the lower die exit and the die gap and the exit compression ring being shaped to clean the surface of the die and to provide a smooth surface finish to the hollow tube of hot thermoplastics material as it passes over the compression ring;

closing a pair of mould halves around the extruded parison;

inserting a blow pin into the parison;

blowing air through the blow pin to inflate the parison against the mould halves; and releasing a formed article from the mould.

2. A method as claimed in claim 1 wherein the exit compression rings forms an extension of the mandrel and projects from the mandrel towards the die.

3. A method as claimed in claim 2 wherein the exit compression rings projects from the mandrel for a distance of at least 0.2 mm towards the die.

4. A method as claimed in claim 3 wherein the exit compression rings projects from the mandrel for a distance of approximately 0.3 mm towards the die.

5. A method as claimed in claim 1 including the step of enhancing the flow of thermoplastic material along the die by treating the die surface to enhance wear resistance and to enhance flow of thermoplastics material.

6. A method as claimed in claim 5 wherein the die face is ion impregnated.

7. A method as claimed in claim 1 including the step of automatically releasing a formed parison from the outer faces of the die and mandrel.

8. A method as claimed in claim 7 wherein release means is provided on the outer faces of the die and mandrel.

9. A method as claimed in claim 8 wherein the release means is a first strip of material provided along the outer face of the die and a second strip of material provided along the outer face of the mandrel.

10. A method as claimed in claim 1 including the step of heating the die at least adjacent to the die gap.

11. A method as claimed in claim 10 wherein the die is heated by applying a heater band to the outside of the die.

* * * * *